April 19, 1949.    J. DE MENT    2,467,661
ULTRAVIOLET STROBOSCOPE
Filed April 29, 1946
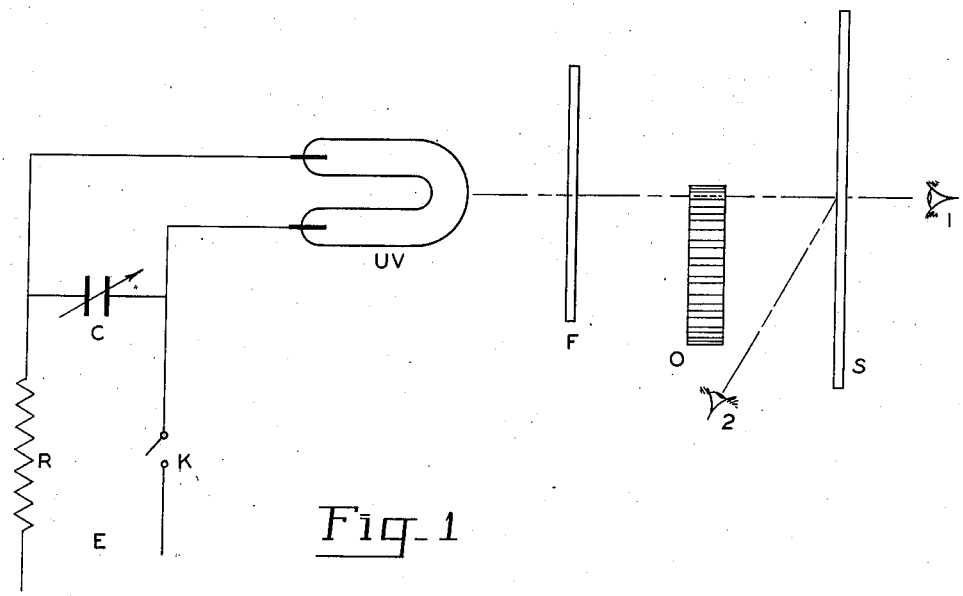
Fig_1
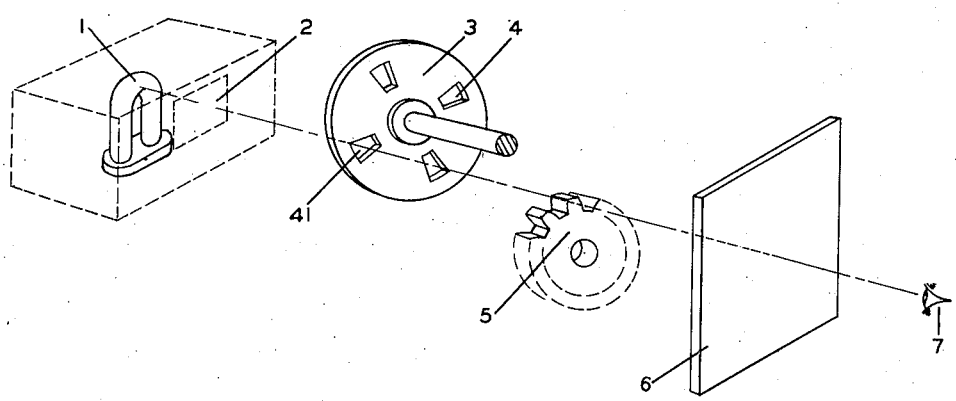
Fig_2
INVENTOR.
JACK DE MENT Patented Apr. 19, 1949

2,467,661

UNITED STATES PATENT OFFICE 2,467,661

ULTRAVIOLET STROBOSCOPE

Jack De Ment, Portland, Oreg.

Application April 29, 1946, Serial No. 665,687

5 Claims. (Cl. 250—71)

The present invention relates to means and apparatus for stroboscopic technique that is independent of visible light, offering novel and improved advantages over the stroboscopic equipment now known to the art.

Among the objects of the present invention is the employment of new optical principles in stroboscopy. These new optical principles involve the utilization of invisible, fluorescigenous ultraviolet light.

Another of the objects of the present invention is to provide an entirely new means by which the stroboscopic image may be observed.

The present invention also has as an object the stroboscopic examination of moving objects in a manner which permits a study of the appearance of said moving objects in ultraviolet light, the features which are revealed being in many instances considerably different than those secured in apparatus now known to the art. Thus, a moving gear possessing a grease or oil film or coating will in visible light not always appear distinctive, but in ultraviolet light such fluorescent greases and oils will appear dark since they totally absorb the ultraviolet light. On the other hand, particles of metal, which may be present in faulty machinery in motion may not be seen with visible light, but will appear bright with my new invention since they are more apt to reflect ultraviolet light, making their presence known on a fluorescent screen or a photographic plate.

Moreover, a phase of the above-mentioned object of the present invention is developed when it is known that in ultraviolet light metallic surfaces may appear, when brought out by suitable means, completely different than in visible light. For example, in the use of visible light stroboscopy in studying phenomena such as the breaking of a projectile at its point of impact with a target, it is frequently difficult or impossible to ascertain the difference between freshly broken shrapnel particle surfaces, and those which are older or are derived from the surface of the projectile itself. With my invention, such problems may be considerably simplified since a fresh metal surface will reflect ultraviolet light, and an older, say an oxidized or coated surface, will not. Hence it is possible to secure an insight as to the origin of flying shrapnel fragments, broken machinery within a moving machine, motor parts, and the like.

The present invention has as an object the employment of phosphorescent screens in connection with ultraviolet stroboscopic observations. This permits a considerable broadening in the fundamental principles of the art of stroboscopy, and the ultraviolet stroboscope is therefore applicable to entirely new fields. Thus, a phosphorescent screen permits what may be termed isosynchronous inspection, i. e., ultraviolet stroboscopy of a moving object with the phosphorescent screen image remaining for periods that are not synchronous with the motion of the object under inspection. This feature of my invention will be hereinafter described in greater detail.

It is among the objects of the present invention to make accessible to the scientific photographer, an entirely new means of photography in which highly actinic ultraviolet light from my new ultraviolet stroboscopic light source may be employed in the invisible photography of very rapidly moving objects. In the present art of high speed photography, say in ballistics work, the stroboscopic light source is synchronized with the camera, so as to enable the camera to catch the object during a brief instant, at which time the object is illuminated by a burst of light.

Other objects of the present invention will be made evident in the hereinafter-given disclosure.

The stroboscope is an instrument for studying the successive phases of a periodic or varying motion by means of light periodically interrupted. The stroboscope, so far as engineers are concerned, may be defined as an apparatus used for intermittent viewing of rotating machinery. In the present application it is to be understood that great departures may be made from the design, construction and utilization of the present invention, known hereinafter as the "Ultraviolet stroboscope," without violating the basic principles and spirit of the herein-disclosed means and methods of invisible and improved ultraviolet stroboscopy.

The conventional stroboscope, depending upon visible light sources, is applied to a variety of fields, principally those dealing with engineering mechanics and physical research and development. Modifications and amplications of the stroboscopic apparatus now known to the art have also found valuable application in high speed photography in the study of motion, and for similar purposes in ballistics, dynamics, and related fields of endeavor.

Stroboscopes or stroboscopic-like devices were once employed in television receivers, and to a certain extent are now used for research in that field. Picture and image transmission by wires or by wireless, from photographs, has at times depended upon stroboscopy with visible light.

In the accompanying drawings of my ultraviolet stroboscope, two of the simplest forms of design are illustrated:

In Fig. 1, the invention relies upon a relaxation oscillator, as an interruption means; and Fig. 2 is of the same invention except that it employs a mechanical interrupter.

Describing the drawings in greater detail: In Fig. 1, UV is the ultraviolet light source, F the visible light-opaque, ultraviolet light-transparent filter, O the moving object under study, e. g., a gear or wheel, S a luminescent screen, observable by the eye at either 1 or 2, depending upon whether the screen is translucent or opaque. The relaxation oscillator for producing pulses of ultraviolet light is schematically shown by the circuit as follows: E is a source of electro-motive force, K a switch, R a resistance and C a variable condenser.

In Fig. 2, the same invention employs mechanical interrupting shutter apparatus. The numerals 1 refer to an ultraviolet light source, 2 to a filter excluding visible light but passing ultraviolet light, 3 to a rotating disk, 4 to the slots thereon, 41 to a slot with the ultraviolet beam passing through it, 5 to the moving object, such as a gear, under study, 6 to the luminescent screen and 7 to the eye.

In Figs. 1 and 2, the letter s and the numeral 1, respectively, indicate luminescent screens, of a nature hereinafter disclosed, but these may be supplanted with photographic film or plate, as is also hereinafter described.

The ultraviolet stroboscope relies upon the means, well known to the art, for stroboscopy insofar as the production of periodic or intermittent light pulses and their synchronization or other relationship to the moving object or periodic motion under visual or photographic inspection may be concerned, and therefore does not purport to claim such mechanical and electrical means and methods as are well known to the art. While the present invention relies upon certain of the existing principles of the current art of stroboscopy, it nevertheless extends optical principles and means for interpretation as will be explained.

The means for the production of intermittent light pulses for stroboscopy may roughly be divided into two kinds: (a) electrical or electronic and (b) mechanical.

The mechanical means are illustrated by a rotating opaque disk over the light source, this disk being provided with one or more slots or apertures, through which the light may pass. The rotating disk operates in such a fashion so as to permit different rates of speed, according to the application. This may conveniently be accomplished by means of a rheostat or resistor in the electrical line supplying the motor which causes the rotation of the disk.

This earlier type of stroboscope with its rotating slotted disk or shutter relied for speed of viewing upon the number of slots and the speed of rotation. When the speed of rotation and number of slots, whose combined effect would be to permit light impulses to pass at a given frequency, becomes synchronized with the movement under inspection, the movement or rotating part under inspection appears to be motionless; or, when synchronization of the two moving parts is approached, the motion of the moving part under observation appears to lessen.

These mechanical devices have been largely supplanted by those of an electrical or electronic nature, though the mechanical equipment is yet employed in research work and for certain specialized applications of stroboscopy.

Whereas the mechanical means merely interrupts an otherwise continuous beam of light, the electrical means actually pulse or interrupt the production of light at its source. These latter means in general are known to the art as oscillators.

A simple example of an electric oscillator is that known to the art as a relaxation oscillator. In its most rudimentary form, it consists of a condenser, say a variable condenser, connected in parallel with a discharge tube, i. e., stroboscopic light source, and in series with a resistance, with a source of E. M. F., and a key or switch.

In operation, the switch or key is employed to close the circuit. The condenser becomes charged until the potential difference between the plates reaches the sparking potential, after which the discharge occurs. As the condenser voltage decreases, the discharge eventually ceases, then begins to build up with rise of plate potential, and the process is again repeated.

If the time of discharge is small compared with the time required for recharging the condenser, the periodic time of the oscillation is expressed by:

$$T = CR \log (E - V_b)/(E - V_c)$$

where T is the periodic time, E is the applied E. M. F., and $V_c$ and $V_b$ are the sparking and extinction potentials respectively of the tube.

A range of oscillations varying between radio frequency and two discharges every minute can be obtained in this way.

On the basis of this simple relaxation oscillator circuit, numerous refinements and amplifications have been constructed, and are also well known to the art. Thus, stroboscopic black light or variably intermittent ultraviolet light pulsations can be secured with circuits employing a flashing transformer controlled by a thyratron tube. Sundry mechanical and electromechanical means are also well known to the art, and representative means include vibrating hammer, solenoidal, rotary contact breakers, and certain electrolytic interrupters, all applicable to the production of stroboscopic ultraviolet light.

In view of the two principal means for pulsing a light beam, that is to say, for the production of an intermittent source of light rays, two basic designs of the present invention, the ultraviolet stroboscope, can be delineated on this basis. Briefly, in one kind, the beam of ultraviolet light is continuous and is rendered at will discontinuous by mechanical or similar interruption means. In the second kind, the actual production of ultraviolet light at its source is made intermittent, broadly corresponding to the hereinbefore described electrical oscillation means, permitting the attainment of frequencies not possible with mechanical means.

In the case of mechanical interruption of ultraviolet light beams, ultraviolet light-opaque, slotted disks or shutters are employed. These may be actuated by any agency that is convenient. This type of production of stroboscopic ultraviolet light will be hereinafter referred to as "Type A."

Type A stroboscopic ultraviolet light can best be secured from the so-called high-pressure mercury arcs, those operating at higher temperatures with greater current consumption than the low-pressure discharge tube. High pressure mercury arcs provide abundant amounts of long-wavelength ultraviolet light, and are available in a variety of sizes and designs.

Inherently, Type A stroboscopic ultraviolet light can be obtained from any source of ultraviolet light, including the low-pressure mercury arcs, incandescent filaments, hot bodies and the like.

In the case of electrical or electronic interruption of the production of ultraviolet light at its source, disks or shutters need not of course be employed — the light source itself actually pulsates or turns off and on at various frequencies. This means for the production of stroboscopic ultraviolet light will be hereinafter referred to as "Type B."

Type B stroboscopic ultraviolet light can be secured from the low-pressure mercury arcs, or discharge tube design ultraviolet lamp that operates with low current consumption at high potentials. These units are generally made from fused silica since they emit short-wavelength ultraviolet light.

Whereas I have disclosed in the previous paragraphs preferred forms of ultraviolet light units or sources, I do not exclude either interrupted high tension spark discharges, which are known to produce abundant and usable amounts of ultraviolet light, or metal or carbon or other open arcs, the ultraviolet light from which is preferably rendered stroboscopic by mechanical or electromechanical means.

From what is stated in the preceding, it is thus apparent that my ultraviolet stroboscope covers a wide range of the ultraviolet light region, from the short wavelengths, i. e., down to less than 2000 Angstrom units, into the long wavelengths or near-ultraviolet adjacent to the lower or violet edge of the visible spectrum.

In my invention, the ultraviolet light is rendered free of extraneous visible rays that are always present upon generation by the sources we now know, including the mercury arcs. For the purpose of securing a beam of ultraviolet light substantially free of visible radiations, I employ one or more of the purple glass filters, e. g., those manufactured by Corning Glass Works, the Kopp Glass Company, or similar glasses of foreign manufacture, that are widely known in the art and science of fluorochemistry.

For filtering short wavelengths, I prefer the use of Corning glass number 986, the lowest range of usable transmission being at about 2500 Angstrom units. For filtering long wavelengths I prefer Corning glass number 584, 586 or 587, all being known as "red purple ultra" glass filters.

For many applications of the stroboscope, such as in photographing the result, it is necessary to employ optical systems or lenses and other optical elements like reflecting prisms to collimate, focus or otherwise influence the stroboscopic light. In the simpler applications of stroboscopy, such means are usually not necessary, but in my invention they may or may not, depending upon the final design, construction and application of the ultraviolet stroboscope, be employed.

The optical elements for ultraviolet stroboscopy consist of media which have two salient characteristics: (a) lack of fluorescence and (b) transparency to ultraviolet light. Ordinary glasses in general do not possess these features to the required degree, so lenses and other optical element must be fabricated from quartz, fused silica, Corex, Uviol, or other high silica content glasses. Other media are known to possess the requirements, and these include lithium fluoride, sodium chloride, and so on.

It is here that an additional embodiment of my ultraviolet stroboscope is emphasized. I can secure stroboscopic ultraviolet light and render it by optical elements such as lenses and coincidently filter it free from visible rays by employing my filter-lenses that are fully disclosed in my application entitled "Ultraviolet light optical elements," Ser. No. 626,816, filed November 5, 1945.

Furthermore, another feature of my invention is developed at this point. This comprises in placing a luminescent screen or agent directly upon the viewing side (when viewing is conducted by transmission) of the filter glass sheet or filter lens. Information regarding this embodiment will be hereinafter disclosed, and is also completely disclosed in the above-mentioned application.

The means for appreciating the results of my ultraviolet stroboscope can roughly be divided into two kinds: (a) luminscent, which includes both fluorescent (or "glowing") and phosphorescent (or having an "afterglow") and (b) photographic.

The (a) luminescent means may fluoresce or glow only as long as the luminescent material is excited by ultraviolet light, permitting a rapid transition in images, or it may glow after the ultraviolet light has ceased to affect it, permitting subsequent observation or observation at frequencies different than those of synchronization. Moreover, the luminescent means may be defined as (a) opaque, or viewable from the same side as the impinging ultraviolet light beam, (b) translucent and, (c) transparent, both of the latter (b) and (c) usually being viewed on the side opposite impingement of the invisible image bearing ultraviolet light beam.

Luminescent is here used as a broad word that designates fluorescent and phosphorescent or any other type of screen responsive to ultraviolet light.

There are a large number and wide variety of luminescent substances that can be chosen for rendering the ultraviolet light beam visible to the eye. Some of these are described in the hereinbefore referred to application, many others in my book "Fluorochemistry," New York, Chemical Publishing Co., 1945, and in the patent literature. It is not the purpose of the present application to encompass any one screen or material as being preferred or singly suited, since dozens of different luminscent solids may serve equally well. I mention in particular, however, the sulfides of the alkaline earth elements and of zinc, and the tungstates and platinocyanides of alkaline earth elements. These phosphors, activated by trace amounts of metallic salts, possess a wide range of characteristics, being available in both fluorescent and phosphorescent forms. Zinc sulfide activated by copper is a good example. Likewise, calcium and strontium sulfide phosphors prove useful.

Organic compounds like anthracene (both pure and impure), dyed fabrics (like rayon with rhodamine or fluorescent purple G) and hundreds of other substances are capable of serving as luminescent media in my ultraviolet stroboscope.

The luminescent media (a) may be supplanted by either nonmoving or moving photographic plates or film, or chemically sensitized papers.

These materials are well known to the art, and need little description, but I refer especially to both panchromatic film and to blue and green sensitive (orthochromatic) films as being especially suited for the reproduction of the image rendered in my ultraviolet stroboscope.

What I claim is:

1. Apparatus for ultraviolet stroboscopy comprising in combination with a source of ultraviolet light, means for rendering the ultraviolet light free of visible light, means for variably and intermittently interrupting said ultraviolet light source, means for collimating the interrupted ultraviolet light and directing it against an object to be stroboscopically examined, and luminescent means responsive to ultraviolet light and converting said ultraviolet light into visible light.

2. Apparatus for ultraviolet stroboscopy comprising in combination with a source of ultraviolet light, means for rendering the ultraviolet light free of visible light, electric means for variably and intermittently interrupting said ultraviolet light source, means for collimating the interrupted ultraviolet light and directing it against an object to be stroboscopically examined, and luminescent means responsive to ultraviolet light and converting said ultraviolet light into visible light.

3. Apparatus for ultraviolet stroboscopy comprising in combination with a source of ultraviolet light, means for rendering the ultraviolet light free of visible light, mechanical means for variably and intermittently interrupting ultraviolet light issuant from said ultraviolet light source, means for collimating the interrupted ultraviolet light and directing it against an object to be stroboscopically examined, and luminescent means responsive to ultraviolet light and converting said ultraviolet light into visible light.

4. A stroboscopic system for utilizing ultraviolet light from a source of ultraviolet light, characterized by means for filtering the said ultraviolet light free from visible light, means for collimating the resulting invisible ultraviolet light, means for interrupting said ultraviolet light source so as to permit pulses thereof, means associated with said interrupting means for selectively varying the pulsing frequency, and luminescent means responsive to ultraviolet light and converting said ultraviolet light into visible light.

5. A stroboscopic apparatus for utilizing ultraviolet light from a mercury arc source of ultraviolet light, characterized by means for filtering the said ultraviolet light free from visible light, means for collimating the resulting invisible ultraviolet light, means for interrupting said ultraviolet light to produce pulses thereof, means associated with said interrupting means for selectively varying the pulsing frequency, and luminescent means responsive to ultraviolet light and converting said ultraviolet light into visible light.

JACK DE MENT.

REFERENCES CITED

The following references are of record in the file of this patent:

UNITED STATES PATENTS

| Number | Name | Date |
|---|---|---|
| 1,565,596 | Snook | Dec. 15, 1925 |
| 2,085,100 | Knowles et al. | June 29, 1937 |
| 2,268,133 | Carlson | Dec. 30, 1941 |

OTHER REFERENCES

"The Mercury Arc as an Actinic Stroboscopic Light Source," by Harold E. Edgerton and Kenneth J. Germeshausen (Massachusetts Institute of Technology, Cambridge, Mass.) Rec. May 24, 1932, pp. 535–542.